United States Patent [19]

Heck

[11] 4,175,336
[45] Nov. 27, 1979

[54] BRIDGE PLAYING APPARATUS

[76] Inventor: Theodore G. Heck, 10 Haddon Pl., Fort Washington, Pa. 19034

[21] Appl. No.: 880,769

[22] Filed: Feb. 24, 1978

[51] Int. Cl.² .......................... G09B 19/22; A63F 1/06
[52] U.S. Cl. .................................. 35/8 B; 273/148 R
[58] Field of Search ............... 35/8 B, 9 E, 9 F, 31 E, 35/75, 35 B; 273/148 R

[56] References Cited

U.S. PATENT DOCUMENTS

| | | | |
|---|---|---|---|
| 1,867,888 | 7/1932 | Obidine | 35/9 E |
| 1,912,984 | 6/1933 | Jones | 35/8 B X |
| 2,693,646 | 11/1954 | Hawkins | 35/9 E |
| 3,013,349 | 12/1961 | Cooper | 35/8 B X |
| 3,364,596 | 1/1968 | Correa | 35/9 F |
| 3,628,259 | 12/1971 | Kahn | 35/75 X |
| 4,009,522 | 3/1977 | Borianne | 35/8 B |
| 4,009,884 | 3/1977 | Weigl | 35/8 B X |

FOREIGN PATENT DOCUMENTS

| | | | |
|---|---|---|---|
| 552047 | 6/1932 | Fed. Rep. of Germany | 273/148 R |
| 1149806 | 7/1957 | France | 35/75 |
| 606380 | 8/1948 | United Kingdom | 273/148 R |

Primary Examiner—Willian H. Grieb
Attorney, Agent, or Firm—Miller & Prestia

[57] ABSTRACT

A bridge playing apparatus is disclosed that is adapted for use with a bridge column of a newspaper, magazine or the like. The apparatus comprises an outer housing member having a pair of windows cut therethrough and two inner members slidably disposed within the outer housing. Through relative sliding action of the inner members relative to the outer housing, the printed indicia relating to the player's hand, sequential bidding, and the dummy are selectively exposed or covered. The apparatus allows the player to study his hand without peeking at the dummy or his opponents' hands and then bid his hand and compare his bid with the bids suggested in the column by incrementally uncovering a portion of the column corresponding to the sequential bidding information. The player may then expose the dummy hand and plan his play. Then, all of the hands may be uncovered and the player may then ascertain how well the hand was played.

9 Claims, 6 Drawing Figures

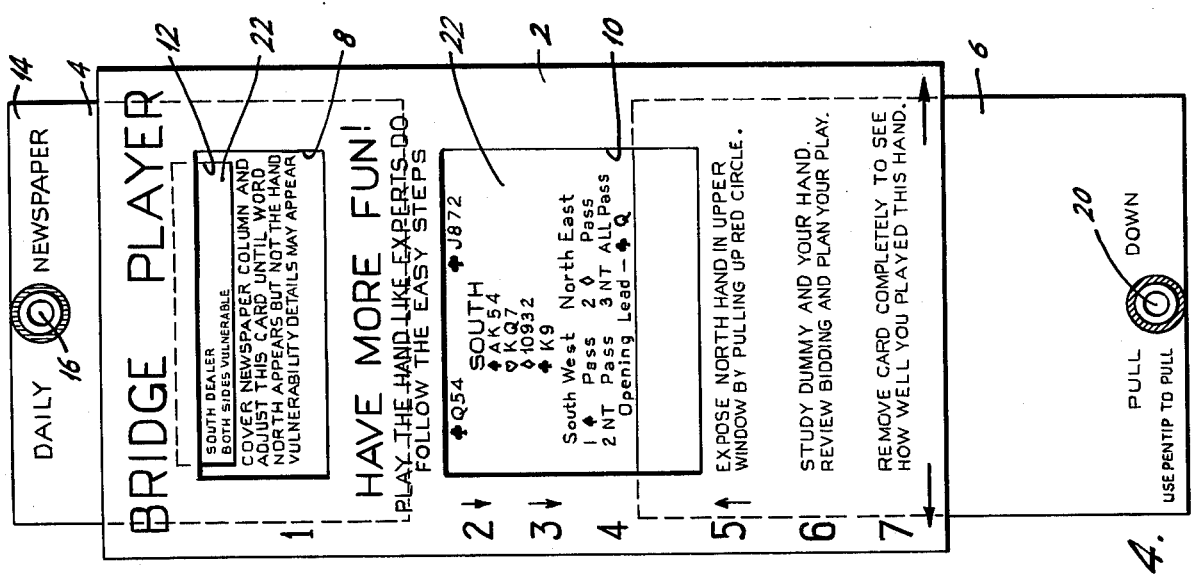
FIG. 1.
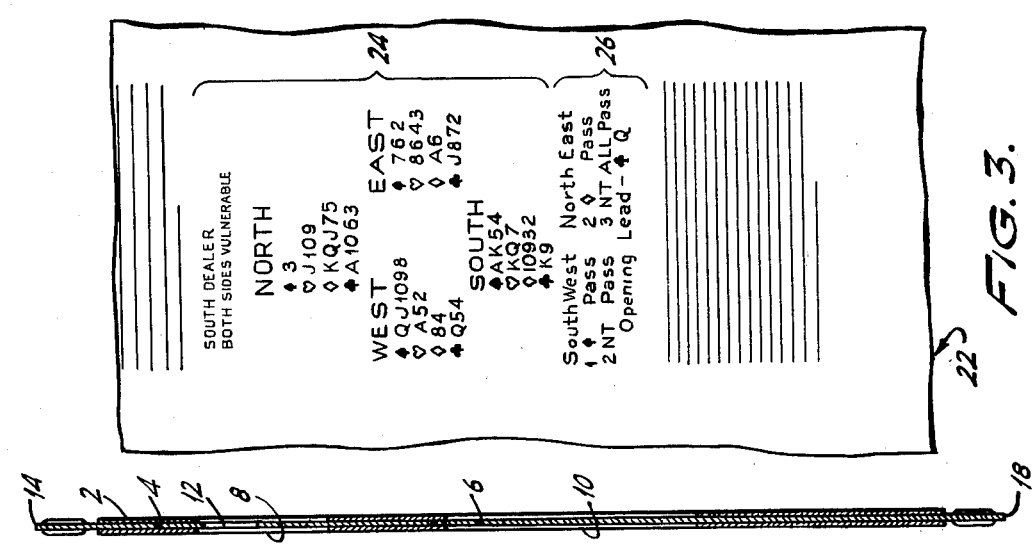
FIG. 2.
FIG. 3.
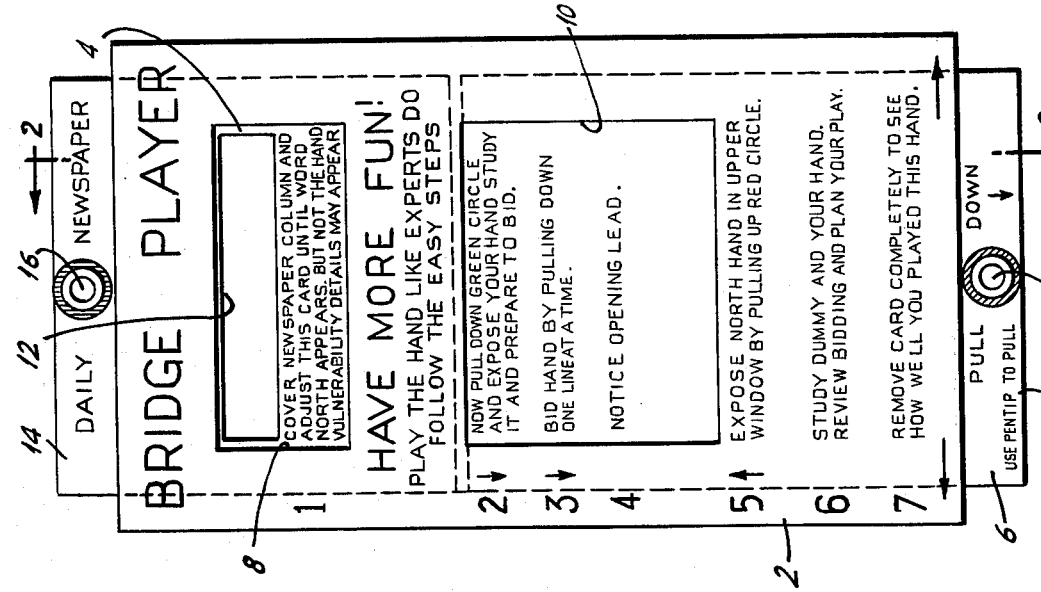
FIG. 4.

BRIDGE PLAYING APPARATUS

1. BACKGROUND OF THE INVENTION

The present invention relates to an apparatus that is adapted for use with a bridge playing chart such as that appearing in the bridge column of any type of publication. The apparatus allows the user to improve his bridge skills by allowing him to selectively expose or cover certain bridge playing indicia corresponding to the contents of his own hand, the dummy hand, his opponents' hands, and the suggested bidding. The invention is designed to simulate the conditions and sequences under which a bridge hand is actually played.

2. PRIOR ART

The prior art discloses varied devices designed to aid in teaching or improving one's bridge skills.

For instance, U.S. Pat. No. 3,013,349 (Cooper) discloses a bridge bidding device including an outer housing and an inner member slidably disposed within the housing. The housing is provided with a plurality of apertures extending along the side housing portions and a centrally disposed window cut therethrough. The inner member includes a plurality of groups of printed indicia relating to the point count of variable bridge hands. Dots are provided on the inner member, and when a dot is aligned with one of the apertures, the printed indicia on the inner member relating to the proper bidding sequence, is shown through the housing window.

Other bridge games are disclosed in U.S. Pat. Nos. 4,009,884 (Weigl) 4,009,522 (Borianne), and 1,912,984 (Jones).

All of these prior art bridge games and devices require the use of specially imprinted card members and the like that are slidably disposed within outer housing members, and the disclosed devices cannot be used in conjunction with the usual bridge columns that appear in newspapers, magazines and the like.

3. OBJECTS OF THE PRESENT INVENTION

Accordingly, it is an object of the present invention to provide a device that allows the user to learn or improve existing skills by studying, bidding, and playing the hands that are included in bridge columns that appear in daily newspapers and other publications.

It is a more specific object to provide a device adapted for use with the usual bridge columns in newspapers, etcetera that allows the user to first view his hand without looking at other players' hands, bid and check his bids against those suggested in the column, expose the dummy hand without seeing his opponents' hands, plan the play, and then expose all of the hands to see how the hand was played.

These and other objects are met by the present invention.

4. SUMMARY OF THE INVENTION

Basically, the bridge playing device includes an outer housing having a pair of windows cut therethrough. A first inner member is slidably disposed within the housing and communicates with one of the windows provided in the outer housing to selectively cover and uncover the bridge playing indicia printed in the bridge column. A second inner member is also slidably disposed within the outer housing and this second member communicates with the other outer housing window and selectively exposes and covers other bridge playing indicia printed in the bridge column.

The apparatus is superposed over a bridge playing chart such as that appearing in a newspaper. The chart includes indicia imprinted thereon corresponding to the respective hands of a player, his partner, and their two opponents (said hands being designated as South, North, East and West). The chart further comprises printed columns corresponding to the sequential bidding of the players.

The player places the apparatus over the bridge chart and covers the printed indicia corresponding to the respective hands and the sequential bidding. Then, the player exposes his hand (South) by slidably moving the second inner member within the outer housing so that the indicia corresponding to the South hand are exposed through one of the windows provided in the outer housing. Next, the sequential bidding indicia are incrementally exposed through the same window in said outer housing by further sliding movement of the second inner member relative to the outer housing. Next, the player exposes his partner's hand (North) through the other window provided in the housing by slidably moving the first inner member relative to the outer housing. After the North hand is exposed, the player plans his play and then lifts the entire assembly off the bridge playing chart. Thus, the player can ascertain how well or badly he planned the play.

The foregoing will be further explained in conjunction with the following detailed description and drawings, which show and describe specific forms of the invention, which are defined in the appended claims.

5. BRIEF DESCRIPTION OF THE DRAWINGS

In the drawings,

FIG. 1 is a plan view of one embodiment of the bridge player apparatus showing the inner members partially in phantom;

FIG. 2 is a sectional view taken along the lines and arrows 2-2 which appear in FIG. 1;

FIG. 3 is a plan view of a bridge game chart used in conjunction with the disclosed apparatus;

FIG. 4 is a plan view showing the apparatus of FIG. 1 superposed over the game chart;

6. DETAILED DESCRIPTION OF A PREFERRED EMBODIMENT

Figures 5, 6:
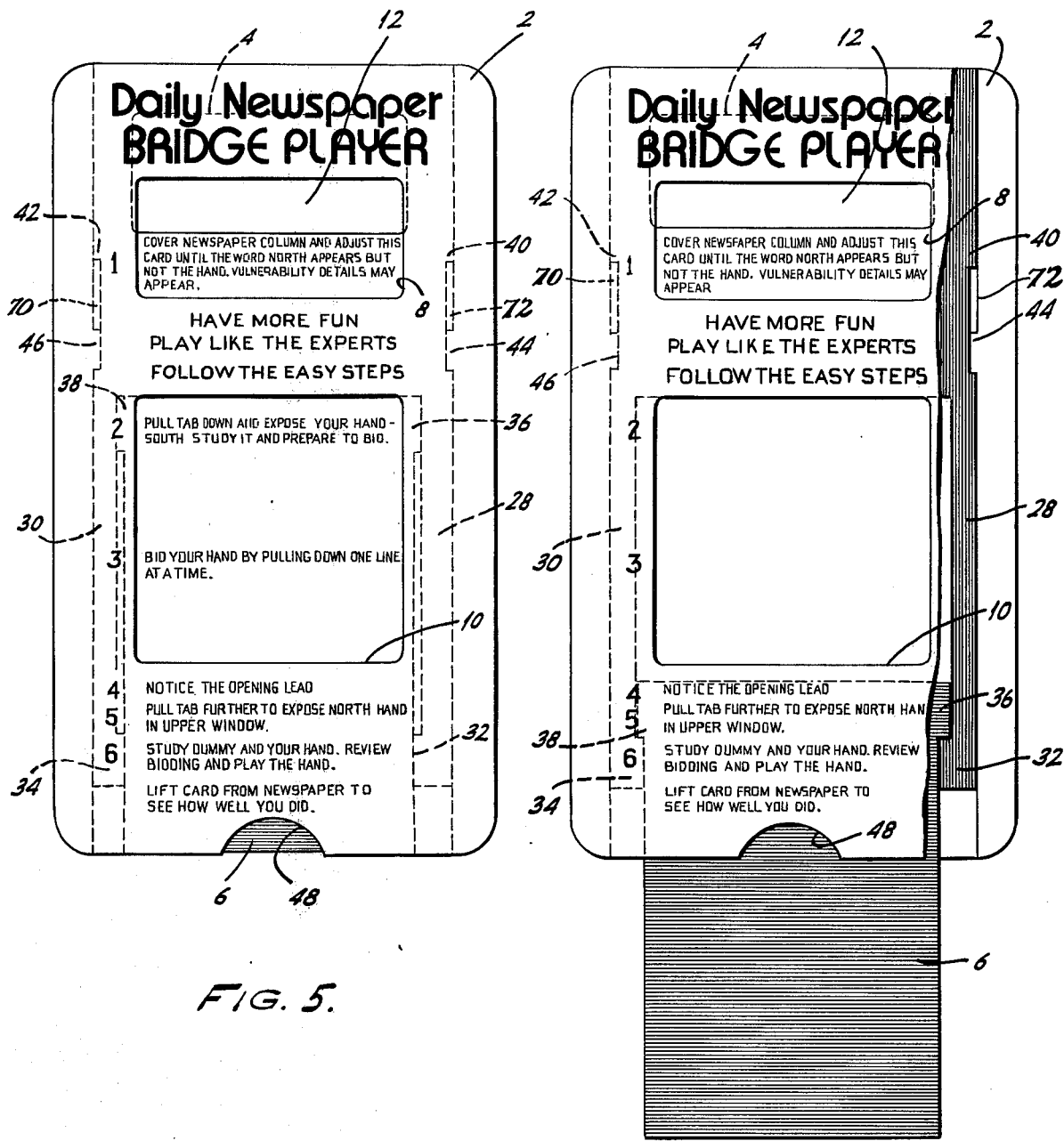
FIG. 5 is a plan view of another embodiment with the sliding inner members shown partially in phantom; and, FIG. 6 is a partially cut-a-way plan view of the apparatus shown in FIG. 5, with the second inner member shown in its fully retracted position.

The following description is directed specifically to the forms of the invention illustrated in the drawings and is not intended to limit the scope of the invention, which is defined in the appended claims.

With reference to FIGs. 1 through 4 of the drawings, there is shown one embodiment of the bridge player apparatus. The apparatus comprises an outer housing 2, a first inner member 4 and second inner member 6 that are both slidably disposed within the housing member 2.

As shown, outer housing 2 includes two windows 8, 10 cut completely through the housing. The first inner member is also provided with a window 12.

The first inner member is also provided with a portion 14 that normally protrudes from the outer housing 2. This portion 14 is provided with an aperture 16 into which a pen point or the like may be received to manually actuate sliding movement of the first inner member 4. Likewise, the second inner member 6 is also provided with a portion 18 that normally protrudes from the outer housing 2. This portion 18 is similarly provided with an aperture 20 into which a pen point or the like may be inserted to manually actuate relative sliding movement of the second inner member 6.

With reference to FIG. 2 of the drawings, there is shown a bridge game chart such as the type that normally appears in the daily bridge column of a newspaper.

The chart 22 includes printed indicia thereon. The indicia includes printed information corresponding to the hands of the respective players 24, and the sequential bidding 26.

With reference to FIG. 4, it can be seen that the player first covers the game chart 22 with bridge player apparatus and adjusts the first inner member 4 so that the window 12 of the first inner member 4 and the window 8 of the outer housing expose the word North. Next, the user slides the second inner member downwardly as appears in FIG. 4 to expose the South hand through the second window 10 provided in the outer housing 2. Further downward sliding movement of the second inner member 6 exposes the bidding information 26 through the window 10, the opening lead is also disclosed.

The player then slides the first inner member 4 upwardly until the entire North hand is visible through the window 8 provided in the outer housing. The North hand is then studied and the play is then planned. The entire apparatus is then removed from the bridge playing chart, so that the player can see his opponents' hands and then review all four hands and the text of the bridge column, in order to see how well he played the hand.

FIGS. 5 and 6 depict a preferred embodiment of the invention wherein sliding movement of the first inner member 4 is actuated only after the second inner member 6 has been slidably moved downwardly (with respect to the drawings) through a predetermined distance.

Here, the first inner member 4 is provided with a pair of elongated legs 28, 30 that terminate in flange members 32 and 34 of the first inner member. The second inner member 6 is also provided with a pair of flanges 36 and 38. The first inner member 4 is also provided with stop members 40, 42 that engage notches 44, 46 of the outer housing 2 to limit downward sliding motion of the first inner member 4. The outer housing 2 is also provided with a tab opening 48 so that the user may easily grasp the sliding second inner member 6.

In the embodiment shown in FIGS. 5 and 6, the first inner member 4 is adjusted until the word "North" on the bridge chart can be seen through the window 8. Then, the member 6 is pulled downwardly to expose the South hand through the window 10. The second inner member 6 is pulled further downwardly until the sequential bidding indicia are visible through the window 10.

Opposed walls 70, 72 of the housing form an interior longitudinally extending channel in which the first member 4 and second member 6 are slidably disposed.

At this point, the flanges 36, 38 of the second member 6 abut the flanges 32, 34 of the first member 4. Further downward pulling of the member 6 thus actuates downward sliding of first member 4 so that the indicia corresponding to the North hand appears through the communicating windows 8 and 12. Further downward sliding of the member 4 is limited due to the engagement of the stop members 40, 42 with the notches 44, 46 of the housing 2. The user may then lift the entire apparatus from the bridge chart to ascertain how well the hand was played.

Although this invention has been described in conjunction with certain specific forms and certain modifications thereof, it will be appreciated that a wide variety of other modifications can be made without departing from the spirit of the invention.

I claim:

1. Bridge playing apparatus adapted for use with the bridge column appearing in certain publications such as newspapers and the like comprising:
    (a) an outer housing having a pair of windows cut therethrough, said housing also having a pair of opposed wall members which together define an interior channel in said housing;
    (b) a first inner member slidably disposed within said channel, and communicating with one of said housing windows to selectively cover and uncover certain bridge playing indicia printed in the bridge column, and
    (c) a second inner member slidably disposed within said channel and communicating with the other window in said housing to selectively uncover and cover certain other bridge playing indicia printed in the bridge column, said first and second inner members being disposed in a common plane for sliding movement there-along in said channel.

2. Bridge playing apparatus as recited in claim 1 wherein said first inner member further includes a window cut therethrough.

3. Apparatus as recited in claim 1 wherein said first and second inner members each have portions that protrude from said housing, each of said portions provided with an aperture therein so that the user may insert a pen point or his finger into said aperture to manually actuate sliding movement of both said first and second inner members within said housing.

4. Apparatus as recited in claim 1 wherein indicia corresponding to the directions for use of the apparatus are imprinted upon said outer housing and said first and second inner members.

5. Apparatus as recited in claim 1 further comprising actuation means connecting said first and second inner members for commencing sliding motion of said first inner member in response to sliding movement of said second member through a predetermined distance.

6. Apparatus as recited in claim 5 wherein said actuation means comprise a first pair of flanges carried by said second inner member and a second pair of flanges mounted on said first inner member, said first pair of flanges engaging said second pair of flanges after said second inner member has been slidably moved over a predetermined distance.

7. Combination comprising the bridge playing apparatus recited in claim 3 superposed over a bridge playing chart such as that appearing in a newspaper, said chart comprising indicia imprinted thereon corresponding to the respective hands of a player, his partner, and their two opponents (said hands being designated as South, North, East and West) said chart further comprising printed columns corresponding to the sequential bidding of the players, whereby the player may cover the printed indicia corresponding to the respective hands and the sequential bidding, expose his hand (South) by slidably moving said second inner member along said channel so that the indicia corresponding to the player's hand (South) are exposed through one of the windows provided in said outer housing, incrementally expose the sequential bidding indicia through the same window in said outer housing by further slidably moving said second inner member within said channel and exposing his partner's hand (North) through the other window provided in the housing by slidably moving said first inner member within said channel.

8. Bridge playing apparatus adapted for use with the bridge column appearing in certain publications such as newspapers and the like comprising:
   (a) an outer housing having a pair of windows cut therethrough;
   (b) a first inner member slidably disposed within said housing, and communicating with one of said housing windows to selectively cover and uncover certain bridge playing indicia printed in the bridge column;
   (c) a second inner member slidably disposed within said outer housing and communicating with the other window in said housing to selectively uncover and cover other bridge playing indicia printed in the bridge column, and
   (d) actuation means connecting said first and second inner members for commencing sliding motion of said first inner member in response to sliding movement of said second member through a predetermined distance.

9. Apparatus as recited in claim 8 wherein said actuation means comprise a first pair of flanges carried by said second inner member and a second pair of flanges mounted on said first inner member, said first pair of flanges engaging said second pair of flanges after said second inner member has been slidably moved over a predetermined distance.

* * * * *